US012664719B2

(12) United States Patent
Lu et al.

(10) Patent No.: US 12,664,719 B2
(45) Date of Patent: Jun. 23, 2026

(54) SYSTEM AND METHOD FOR REAL-TIME RAY TRACING IN A 3D ENVIRONMENT

(71) Applicant: InterDigital CE Patent Holdings, SAS, Paris (FR)

(72) Inventors: Heqi Lu, Bordeaux (FR); Patrice Hirtzlin, Betton (FR); Francois-Louis Tariolle, Liffre (FR); Clement Viguier, Castelginest (FR)

(73) Assignee: INTERDIGITAL CE PATENT HOLDINGS, SAS, Paris (FR)

( * ) Notice: Subject to any disclaimer, the term of this patent is extended or adjusted under 35 U.S.C. 154(b) by 88 days.

(21) Appl. No.: 18/579,674

(22) PCT Filed: Jun. 30, 2022

(86) PCT No.: PCT/EP2022/068106
§ 371 (c)(1),
(2) Date: Jan. 16, 2024

(87) PCT Pub. No.: WO2023/285161
PCT Pub. Date: Jan. 19, 2023

(65) Prior Publication Data
US 2024/0312117 A1    Sep. 19, 2024

(30) Foreign Application Priority Data

Jul. 16, 2021    (EP) ..................................... 21305995

(51) Int. Cl.
*G06T 15/06* (2011.01)
*G06T 7/50* (2017.01)
(Continued)

(52) U.S. Cl.
CPC ................ *G06T 15/06* (2013.01); *G06T 7/50* (2017.01); *G06T 7/90* (2017.01); *G06V 10/56* (2022.01)

(58) Field of Classification Search
None
See application file for complete search history.

(56) References Cited

U.S. PATENT DOCUMENTS 8,188,997 B2 * 5/2012 Dammertz .............. G06T 15/06
345/426
2015/0123971 A1    5/2015 Lee et al.
(Continued)

FOREIGN PATENT DOCUMENTS

EP            3675057 A1      7/2020
JP        2015090712 A       5/2015
JP        2017188098 A      10/2017

OTHER PUBLICATIONS

Widmer et al., An Adaptive Acceleration Structure for Screen-space Ray Tracing, HPG '15: Proceedings of the 7th Conference on High-Performance Graphics pp. 67-76, https://doi.org/10.1145/2790060.2790069, Aug. 7, 2015 (Year: 2015).*
(Continued)

*Primary Examiner* — Kee M Tung
*Assistant Examiner* — Biao Chen
(74) *Attorney, Agent, or Firm* — Flaster Greenberg P.C.

(57) ABSTRACT

For rendering a three-dimensional (3D) scene, a set of parameters for one or more objects in the 3D scene are identified. Intermediate structures and corresponding objects for each of the one or more objects in the 3D scene are determined based on the set of identified parameters. A hybrid acceleration structure is determined based on the determined intermediate structures and a classical acceleration structure. A color contribution is determined for the hybrid acceleration structure. The 3D scene is then rendered based on the determined color contribution of the hybrid acceleration structure.

14 Claims, 12 Drawing Sheets

(51) Int. Cl.
    *G06T 7/90*        (2017.01)
    *G06V 10/56*      (2022.01)

(56) References Cited

U.S. PATENT DOCUMENTS

| | | |
|---|---|---|
| 2017/0270146 A1 | 9/2017 | Harrison et al. |
| 2020/0051318 A1 | 2/2020 | Muthler et al. |

OTHER PUBLICATIONS

Hukura et al., Realistic Reflections and Refractions on Graphics Hardware with Hybrid Rendering and Layered Environment Maps, Proceedings of the 12th Eurographics Workshop on Rendering Techniques, pp. 289-293, Jun. 25, 2001 (Year: 2001).*

Lagarde, S., "Image-based Lighting approaches and parallax-corrected cubemap" Sebastien Lagarde, Random thoughts about graphics in game, Word Press, Sep. 2012, retrieved from https://seblagarde.wordpress.com/2012/09/29/image-based-lighting-approaches-and-parallax-corrected-cubemap/ (23 pages).

Tomonori, Shindo, "Ray Tracing Technology Revived by Real-Time Processing", Nikkei Electronics No. 1014, Oct. 5, 2009, 13 pages.

\* cited by examiner

100

200

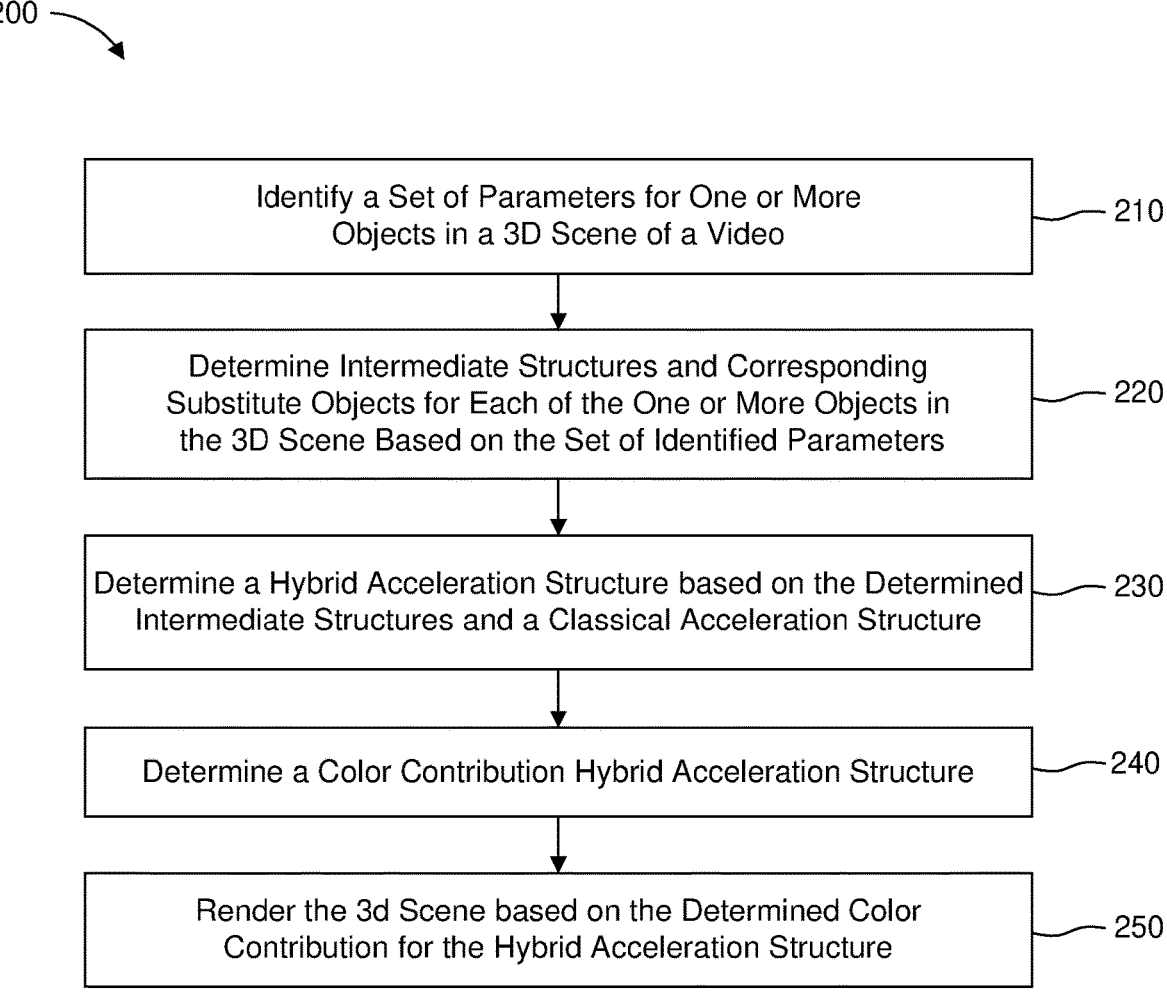

Identify a Set of Parameters for One or More
Objects in a 3D Scene of a Video          — 210

Determine Intermediate Structures and Corresponding
Substitute Objects for Each of the One or More Objects in
the 3D Scene Based on the Set of Identified Parameters          — 220

Determine a Hybrid Acceleration Structure based on the Determined
Intermediate Structures and a Classical Acceleration Structure          — 230

Determine a Color Contribution Hybrid Acceleration Structure          — 240

Render the 3d Scene based on the Determined Color
Contribution for the Hybrid Acceleration Structure          — 250

Reflections

310

Refractive Panel

AR Device
350 (Position of the Main Camera)

Object Proxy

1010

Ray-Proxy
Intersection

1015

Read
Geometry
Depth

1005

MF Camera

SYSTEM AND METHOD FOR REAL-TIME RAY TRACING IN A 3D ENVIRONMENT

TECHNICAL FIELD

The present disclosure generally relates to augmented reality (AR) applications. At least one embodiment relates to the placement of virtual objects in a video, such as, for example, a live-video feed of a 3D environment.

BACKGROUND

Traditionally, ray tracing is a technique used for high quality non-real time graphics rendering tasks, such as production of animated movies, or producing 2D images that more faithfully model behavior of light in different materials. As an example, ray tracing is particularly suited for introducing lighting effects into rendered images. Sources of light may be defined for a scene which casts light onto objects in the scene. Some objects may occlude other objects from light sources resulting in shadows in the scene. Rendering using a ray tracing technique allows the effects of light sources to be rendered accurately since ray tracing is adapted to model the behavior of light in the scene.

Ray tracing rendering techniques are often relatively computationally expensive and memory intensive to implement, particularly if the rendering is desired to be performed in real-time. As such, ray tracing techniques are difficult to implement on devices like mobile phones, tablets, AR glasses for display and embedded cameras for video capture. The embodiments herein have been devised with the forgoing in mind.

SUMMARY

The disclosure is directed to a method for rendering a 3D scene of a video, for example, a live-video feed. The method may take into account implementation on devices, such as, for example, mobile phones, tablets, AR glasses for display and embedded cameras for video capture.

According to a first aspect of the disclosure, there is provided a method for rendering a 3D scene of a video, comprising:

identifying a set of parameters for one or more objects in a 3D scene of a video;

determining intermediate structures and corresponding substitute objects for each of said one or more objects in the 3D scene based on the set of identified parameters; determining a hybrid acceleration structure based on the determined intermediate structures and a classical acceleration structure;

determining a color contribution for the determined hybrid acceleration structure; and providing for rendering said 3D scene of the video based on said determined color contribution of the hybrid acceleration structure.

The general principle of the proposed solution relates to the rendering of non-planar, glossy and/or refractive objects having complex shapes in a 3D scene of a video. High-quality reflection for complex shaped objects is achieved by using a hybrid acceleration structure based on a rendering quality level defined for each object of the 3D scene of the video.

In an embodiment, the set of parameters includes at least one of a simple shape, a distant object, a complex shape, a shape requiring inner reflections and an object near a reflective object.

In an embodiment, the intermediate structures include an identifier.

In an embodiment, the identifier includes color and depth information.

In an embodiment, the intermediate structures are determined using an array camera projection matrix.

In an embodiment, the corresponding substitute objects include geometric data.

In an embodiment, the geometric data is at least one of a center position, and x, y and z-extend values for a primitive shape.

In an embodiment, the classical acceleration structure is one of a grid structure, a bounding volume hierarchy (BVH) structure, a k-dimensional tree structure and a binary space portioning data structure.

According to a second aspect of the disclosure, there is provided a device for rendering a 3D scene of a video, the device comprising:

at least one processor configured to:

identify a set of parameters for one or more objects in a 3D scene of a video;

determine intermediate structures and corresponding substitute objects for each of said one or more objects in the 3D scene based on the set of identified parameters;

determine a hybrid acceleration structure based on the determined intermediate structures and a classical acceleration structure; and provide for rendering said 3D scene of the video based on said determined color contribution of the hybrid acceleration structure.

In an embodiment, the set of parameters includes at least one of a simple shape, a distant object, a complex shape, a shape requiring inner reflections and an object near a reflective object.

In an embodiment, the intermediate structures include an identifier.

In an embodiment, the identifier includes color and depth information.

In an embodiment, the intermediate structures are determined using an array camera projection matrix.

In an embodiment, the corresponding substitute objects include geometric data.

In an embodiment, the geometric data is at least one of a center position, and x, y and z-extend values for a primitive shape.

In an embodiment, the classical acceleration structure is one of a grid structure, a bounding volume hierarchy (BVH) structure, a k-dimensional tree structure and a binary space partitioning data structure.

Some processes implemented by elements of the disclosure may be computer implemented. Accordingly, such elements may take the form of an entirely hardware embodiment, an entirely software embodiment (including firmware, resident software, microcode, etc.) or an embodiment combining software and hardware aspects that may all generally be referred to herein as "circuit", "module" or "system". Furthermore, such elements may take the form of a computer program product embodied in any tangible medium of expression having computer usable code embodied in the medium.

Since elements of the disclosure can be implemented in software, the present disclosure can be embodied as computer readable code for provision to a programmable apparatus on any suitable carrier medium. A tangible carrier medium may comprise a storage medium such as a floppy disk, a CD-ROM, a hard disk drive, a magnetic tape device or a solid-state memory device and the like. A transient carrier medium may include a signal such as an electrical signal, an optical signal, an acoustic signal, a magnetic signal or an electromagnetic signal, e.g., microwave or RF signal.

BRIEF DESCRIPTION OF THE DRAWINGS

Other features and advantages of embodiments shall appear from the following description, given by way of indicative and non-exhaustive examples and from the appended drawings, of which:

FIG. 2 is a flowchart of a particular embodiment of a proposed method for rendering of a virtual object of an AR (augmented reality) or MR (mixed reality) application in a real-world 3D environment;

DETAILED DESCRIPTION

Figure 1:
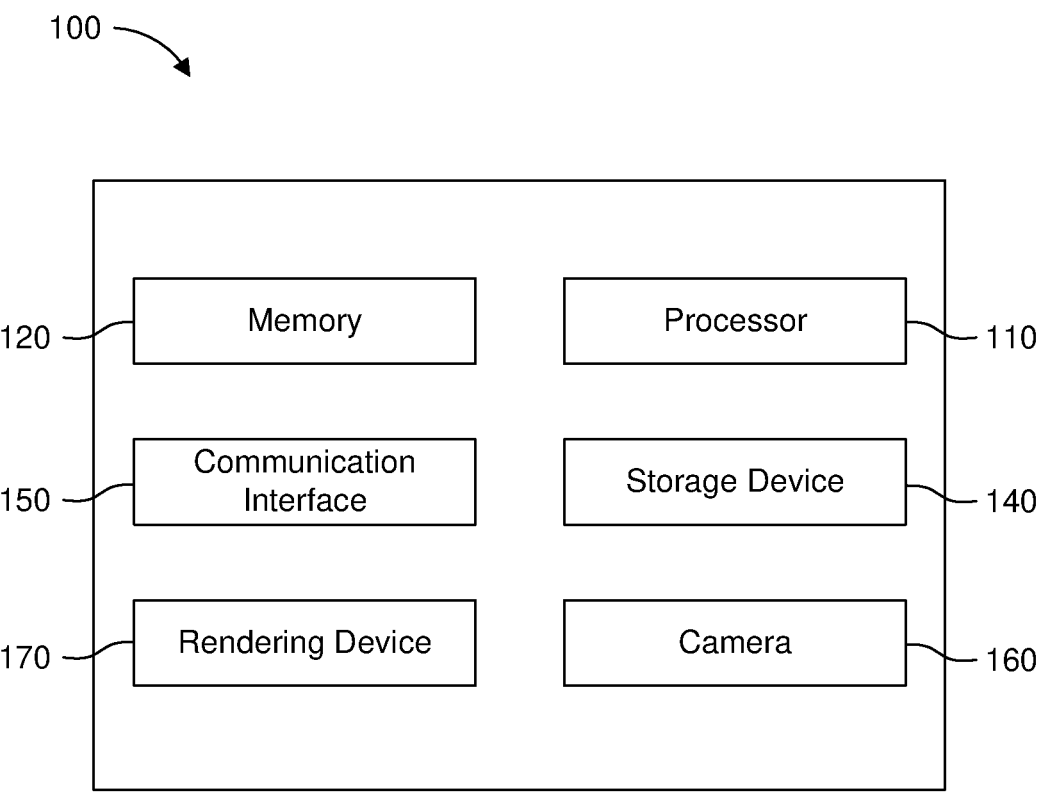
FIG. 1 illustrates an exemplary system for rendering a 3D scene of a video according to an embodiment of the disclosure.

FIG. 1 illustrates an exemplary apparatus for rendering a 3D scene of a video according to an embodiment of the disclosure. FIG. 1 illustrates a block diagram of an exemplary system 100 in which various aspects of the exemplary embodiments may be implemented. The system 100 may be embedded as a device including various components described below and is configured to perform corresponding processes. Examples, of such devices, include, but are not limited to, mobile devices, smartphones, tablet computers, augmented reality glasses for display and embedded cameras for video capture. The system 100 may be communicatively coupled to other similar systems, and to a display via a communication channel.

Various embodiments of the system 100 include at least one processor 110 configured to execute instructions loaded therein for implementing the various processes as discussed below: The processor 110 may include embedded memory, input output interface, and various other circuitries as known in the art. The system 100 may also include at least one memory 120 (e.g., a volatile memory device, a non-volatile memory device). The system 100 may additionally include a storage device 140, which may include non-volatile memory, including, but not limited to, EEPROM, ROM, PROM, DRAM, SRAM, flash, magnetic disk drive, and/or optical disk drive. The storage device 140 may comprise an internal storage device, an attached storage device, and/or a network accessible storage device, as non-limiting examples.

Program code to be loaded onto one or more processors 110 to perform the various processes described herein below may be stored in the storage device 140 and subsequently loaded onto the memory 120 for execution by the processors 110. In accordance with the exemplary embodiments, one or more of the processor(s) 110, the memory 120 and the storage device 140, may store one or more of the various items during the performance of the processes discussed herein below, including, but not limited to, ambient images, captured input images, texture map, texture-free map, cast shadows map, 3D scene geometry, viewpoint's 3D pose, lighting parameters, variables, operations, and operational logic.

The system 100 may also include a communication interface 150, that enables communications with other devices via a communication channel. The communication interface 150 may include, but is not limited to, a transceiver configured to transmit and receive data from the communication channel. The communication interface 150 may include, but is not limited to, a modem or network card and the communication interface may be implemented within a wired and/or wireless medium. The various components of the communication interface 150 may be connected or communicatively coupled together (not shown) using various suitable connections, including but not limited to, internal buses, wires, and printed circuit boards.

The system 100 also includes a video capturing device 160, such as a camera, coupled to the processor for capturing video images.

The system 100 also includes a video rendering device 170, such as a projector, or a screen, coupled to the processor for rendering the 3D scene.

The exemplary embodiments may be carried out by computer software implemented by the processor 110, or by hardware, or by a combination of hardware and software. As a non-limiting example, the exemplary embodiments may be implemented by one or more integrated circuits. The memory 120 may be of any type appropriate to the technical environment and may be implemented using any appropriate data storage technology, such as optical memory devices, magnetic memory devices, semiconductor-based memory devices, fixed memory, and removable memory, as non-limiting examples. The processor 110 may be of any type appropriate to the technical environment and may encompass one or more microprocessors, general purpose computers, special purpose computers, and processors based on a multi-core architecture, as non-limiting examples.

The implementations described herein may be implemented in, for example, a method or a process, an apparatus, a software program, data stream, or a signal. Evan if only discussed in the context of a single form of implementation (for example, discussed only as a method) the implementation of features discussed may also be implemented in other forms (for example, an apparatus or a program). An apparatus may be implemented in, for example, appropriate hardware, software, and firmware. The methods may be implemented in, for example, an apparatus such as, for example, a processor, which refers to processing devices in general, including for example, a computer, a microprocessor, an integrated circuit, or a programmable logic device. Processors also include communication devices, such as, for example, computers, cell phones, portable/personal digital assistants ("PDAs"), tablets, Head-Mounted devices, and other devices that facilitate virtual reality applications.

The disclosure is applicable to Augmented Reality (AR) applications where virtual objects are inserted in (composited with) a live-video feed of a real environment, using see-through devices, such as, for example, mobile phones, tablets, AR glasses for display and embedded cameras for video capture.

The goal is that a viewer watching such mixed video feed cannot distinguish between real and virtual objects. Such applications require the integration of 3D virtual objects into a 2D video image with consistent rendering of light interactions in real time. The virtual object insertion in the real-world video should be the most realistic possible considering several technical aspects: position of the virtual object, orientation of the virtual object (dynamic accuracy, as if the object was hooked/anchored in the real 3D space when the user moves the camera), and lighting conditions (reflection/refraction of different light sources depending on the virtual material properties of the virtual object).

Interactions with both real and virtual worlds mixed together (composited) to render a mixed plausible video feed (mixed reality with synthetic 3D objects inserted in a 2D live-video feed, frame by frame in real-time condition) are also very important. Such interactions may include, for example, light interactions (global illumination, with real and virtual lights), and physical interactions (interactions between objects, both real and virtual), as non-limiting examples.

The speed of the requested computer processing is also important. The latency between acquisition of the real-world scene by the video camera for a single frame and the display of the corresponding "augmented" frame (with 3D objects) on the display device should be close to 0 ms, so that the viewer (which is also the person using the camera) lives an immersive experience.

FIG. 2 is a flowchart 200 of a particular embodiment of a proposed method for placement of a virtual object in an AR (augmented reality) or MR (mixed reality) application in a real-world 3D environment. In this particular embodiment, the method includes five consecutive steps 210 to 250.

In an exemplary implementation, described below; the method is carried out by the rendering device 170 (e.g., a smartphone, a tablet, or a head-mounted display). In an alternative exemplary implementation, the method is carried out by a processor 110 external to the rendering device 170. In the latter case, the results from the processor 110 are provided to the rendering device 170.

Figure 3:
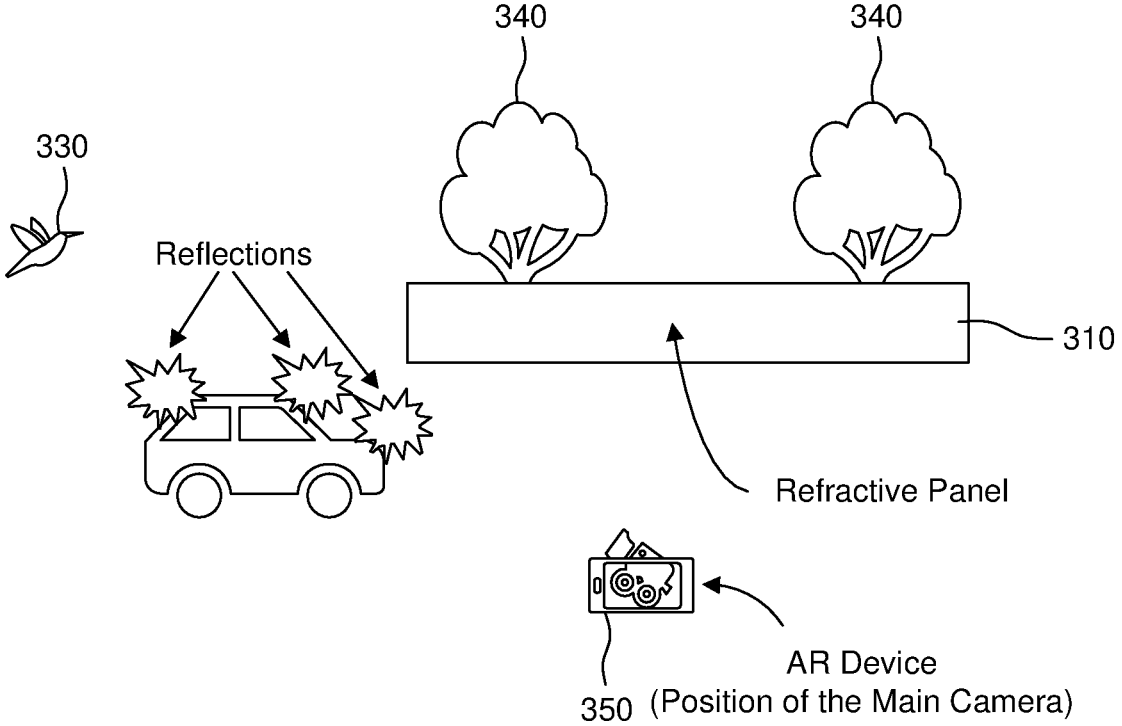
FIG. 3 is an illustration showing a position of a virtual camera as well as a position of a real camera that captures a typical AR scene.

An illustration of a typical AR scene is shown in FIG. 3. The scene shown in FIG. 3 is composed of tangible objects including real objects and virtual objects. An exemplary tangible object that is a real object includes a refractive panel with transparent parts (glass) 310. Some exemplary tangible objects that are virtual objects include a car 320 having metallic/glossy non-planar surfaces, a bird 330 and trees 340.

An additional virtual object (not shown) may be added to the scene to add realism and to support rendering. An invisible virtual refractive panel representative of the real transparent panel, having the same size and position as refractive panel 310, is a non-limiting example.

The following sub-sections describe a particular embodiment of the proposed method 200 of FIG. 2, for placement of a virtual object of an AR (augmented reality) or MR (mixed reality) application in a real-world 3D environment. The particular embodiment provides high-quality rendering for each object of an AR scene displaying a variety of rendering aspects.

In step 210, a set of parameters for objects of a 3D scene of a video are identified. This step is required for non-light and non-camera objects in the scene and is based on a prior knowledge of the AR scene. Each of the objects in the scene are identified as either real objects or virtual objects in the context of AR, based on the set of parameters.

The set of parameters may include, for example, a rendering quality level, an environment importance value and an array of N integer values based on the number of reflective/refractive objects in the scene of the video.

The rendering quality level is defined for each object in the scene of the video by assigning an integer value from 1 to 3. A rendering quality level having an integer value of 1 indicates low-quality rendering and is assigned to objects with simple shapes or distant objects. A rendering quality level having an integer value of 2 indicates a high-quality rendering and is assigned to objects with complex shapes and/or objects requiring inner reflections. A rendering quality level having an integer value of 3 indicates both low and high-quality rendering and is assigned to objects with complex shapes where the rendering quality can be changed during the scene rendering. Non-limiting examples which may be assigned a rendering quality level having an integer value of 3 are objects which become closer to the main camera or to a reflective object.

The environment importance is related to the object's color contribution from the environment of the 3D scene. An integer value from 0 to 2 may be used for the environment importance value. An environment importance value of 0 indicates that the color contribution from the environment is null or negligible. An environment importance value of 1 indicates that the color contribution from the environment is carried by reflection rays. An environment importance value of 2 indicates that the color contribution from the environment is carried by reflection rays and refraction rays. Identifying the appropriate object environment importance value is straightforward.

The size of the array of N integer values corresponds to the number of reflective/refractive objects that are in the scene (e.g., objects having an environment importance different from 0). The higher the N integer value, the better will be the rendering of the selected object for the related reflective/refractive object. The N integer value corresponds to the number of intermediate (middle-field) images to be generated for the selected object for the related reflective/refractive object.

The array of N integer values is set based on the complexity of the selected object shape as well as the object position and distance with respect to the related reflective/refractive objects. N integer values can be changed if these parameters are changed. The array of N integer values is used to optimize the trade-off between rendering quality and performance (e.g., memory cost, frame rate).

Referring to FIG. 3, the set of parameters of the 3D scene objects are described below. The scene depicted in FIG. 3 has two reflective/refractive objects: the car 320 and the refractive (glass) panel 310. Thus, the size of the array of N integer values equals 2. The first element of the array corresponds to the array value for the car 320. The second element of the array corresponds to the array value for the refractive (glass) panel 310.

The car 320 is assigned a rendering quality level having an integer value 2. The car 320 will have high quality rendering due to inner reflections. The car 320 has an environment importance value of 1 because there is a color contribution from reflective rays. The array of N integer vales for the car 320 is [−1, 1]. The first element of the array is set to −1, because the car cannot contribute color to itself. Setting this value to −1 makes this value not relevant. The second element of the array indicates that a single intermediate (middle-field) image will be generated for collecting rays from the car 320 to the refractive (glass) panel 310.

The bird 330 is assigned a rendering quality level having an integer value 3. The bird 330 has a complex shape where the rendering quality may be changed during scene rendering. The bird 330 has an environment importance value of 0), as there is no color contribution from the environment. The array of N integer values for the bird 330 is [2, 1]. The first element of the array indicates that two (2) intermediate (middle-field) images will be used for collecting rays from the bird to the reflective/glossy car 320. The second element of the array indicates that a single intermediate (middle-field) image will be generated for collecting rays from the bird 330 to the refractive (glass) panel 310.

The refractive (glass) panel 310 is assigned a rendering quality level having an integer value 2. The refractive (glass) panel 310 will have high quality rendering due to inner reflections. The refractive (glass) panel 310 has an environment importance value of 2 because there is a color contribution from both reflective rays and refractive rays. The array of N integer values for the refractive (glass) panel 310 is [1, −1]. The first element of the array indicates that a single intermediate (middle-field) image will be generated for collecting rays from the refractive (glass) panel 310 to the car 320. The second element of the array is set to −1, because the refractive (glass) panel 310 cannot contribute color to itself. Setting this array element to −1 makes this value not relevant.

The trees 340 are assigned a rendering quality level having an integer value 1. The trees 340 will have low quality rendering because the trees are distant objects. The trees 340 have an environment importance value of 0 as there is no color contribution from the environment. The array of N integer values for the trees 340 is [2, 3]. The first element of the array indicates that two (2) intermediate (middle-field) images will be used for collecting rays from the trees 340 to the reflective/glossy car 320. The second element of the array indicates that three (3) intermediate (middle-field) images will be generated for collecting rays from the trees 340 to the reflective (glass) panel 310.

Referring to step 220 of FIG. 2, for one particular embodiment, an intermediate structure is determined for selected objects in the 3D scene along with corresponding substitute (proxy) objects for each selected object based on the set of identified parameters from step 210. Step 220 is applicable to objects having a rendering quality level of 1 or 3 and an environmental importance that is non-zero. Such objects will have a color contribution from the environment (e.g., surrounding scene objects) as discussed below with respect to the flowcharts of FIGS. 8-9.

In one exemplary embodiment, a corresponding substitute (proxy) object is used to represent the selected object. The objective of this step is the generation of middle-field images and proxies representing the low-quality rendering object for all potential incoming ray directions. Each generated middle-field image has a unique identifier (ID) and contains color and depth information. As a non-limiting example, the unique identifier (ID) can be stored as a vector of four (4) floating-point components (red, green and blue color information and a value for the depth information).

For objects having a rendering quality level of 1 or 3, the corresponding (proxy) object should preferably have a primitive shape, such as, for example, a bounding box structure. The primitive shape defines an area for the non-light and non-camera objects in the 3D scene.

One technique known as axis-aligned bounding box (AABB) may be used to define the primitive shape. AABB is advantageous as it only requires comparisons of coordinates, it allows the quick exclusion of coordinates that are far apart.

The AABB for a given point set(S) is typically its minimum area subject to the constraint that the edges of the box are parallel to the coordinate (Cartesian) axes. It is the Cartesian product of n intervals, each of which is defined by the minimal and maximal of the corresponding coordinate for the points in S.

The selected object for which the intermediate structure is determined is a source object. The source object has a source proxy (corresponding substitute) object. For the selected object, surrounding scene objects are target objects. Each target object also has a target proxy (corresponding substitute) object.

At the end of step 220, each object having a low rendering quality level stores the following information: an array of middle-field image unique identifiers (IDs); an array of the related camera projection matrices used to render these middle-field images; and proxy (corresponding substitute) geometric data (e.g., the center position, the x, y and z-extend values for Axis-Aligned Bounding Box (AABB)).

Referring to step 230 of FIG. 2, a hybrid acceleration structure is determined based on the intermediate structure determined in step 220 and a classical acceleration structure. The hybrid acceleration structure is generated according to the flowchart of FIG. 4 as discussed below: The classical acceleration structure is added to support the intermediate structures.

Figure 5:
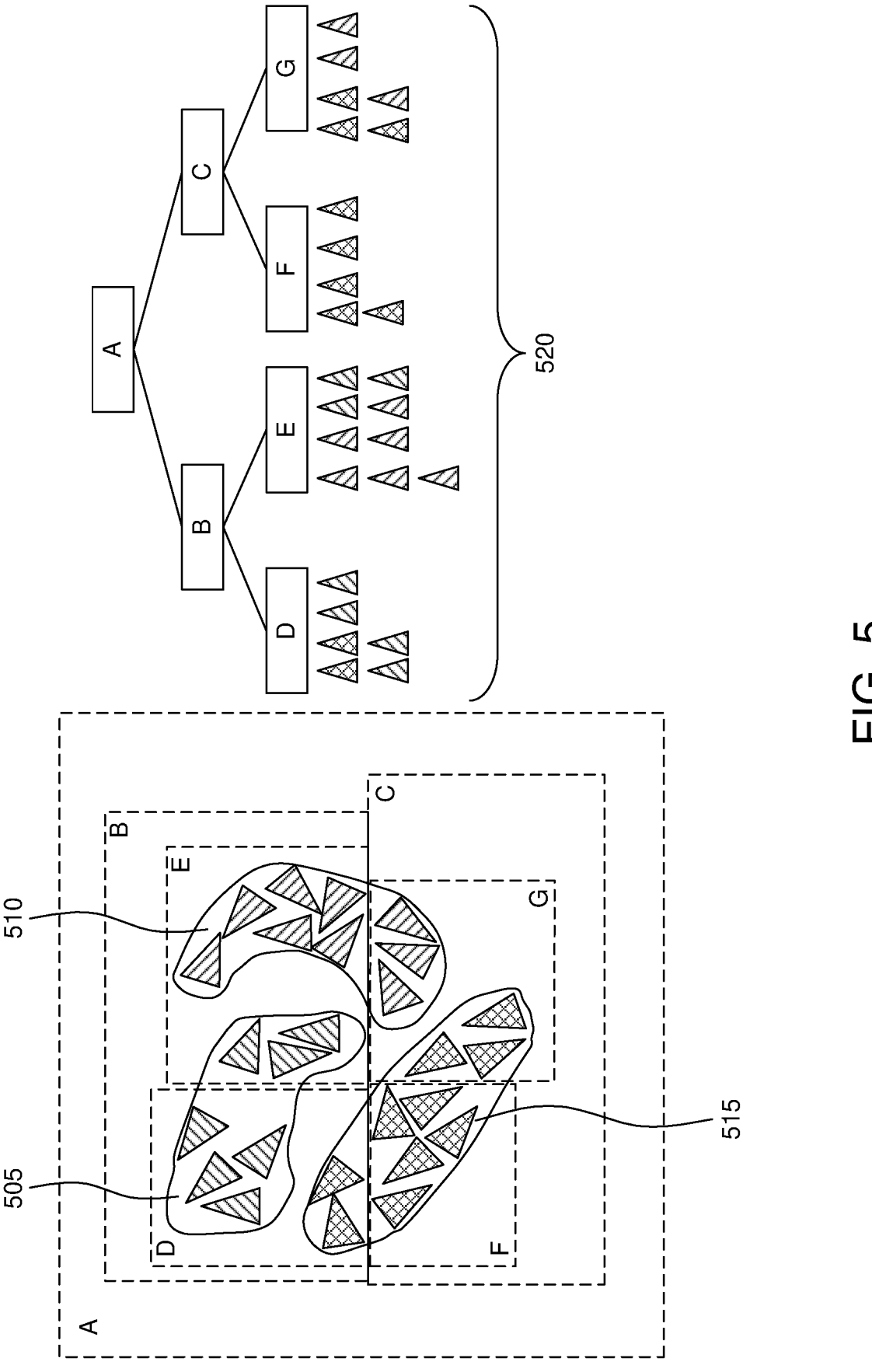
FIG. 5 is an illustration of an exemplary classical acceleration structure including primitives sorted into spatial partition nodes.

FIG. 5 is an illustration of an exemplary classical Bounding Volume Hierarchy (BVH) acceleration structure, including red 505, green 510 and blue 515 objects with triangle rendering primitives along with its corresponding binary tree 520 for a 3D scene. This classical acceleration structure sorts primitives, such as, for example, triangles, into spatial partition nodes and uses simple shapes as the bounds to represent such nodes. For this arrangement, early ray-miss can be detected, instead of testing intersections for each primitive. Such an approach generally speeds up ray-primitive intersection tests.

Referring to FIG. 5, assume that the three objects 505, 510 and 515 have been categorized as:

Blue object 515: low-quality rendering (i.e., rendering quality level of 1)

Red object 505: high quality rendering (i.e., rendering quality level of 2)

Green object 510: both low and high-quality rendering (i.e., rendering quality level of 3).

Figure 4:
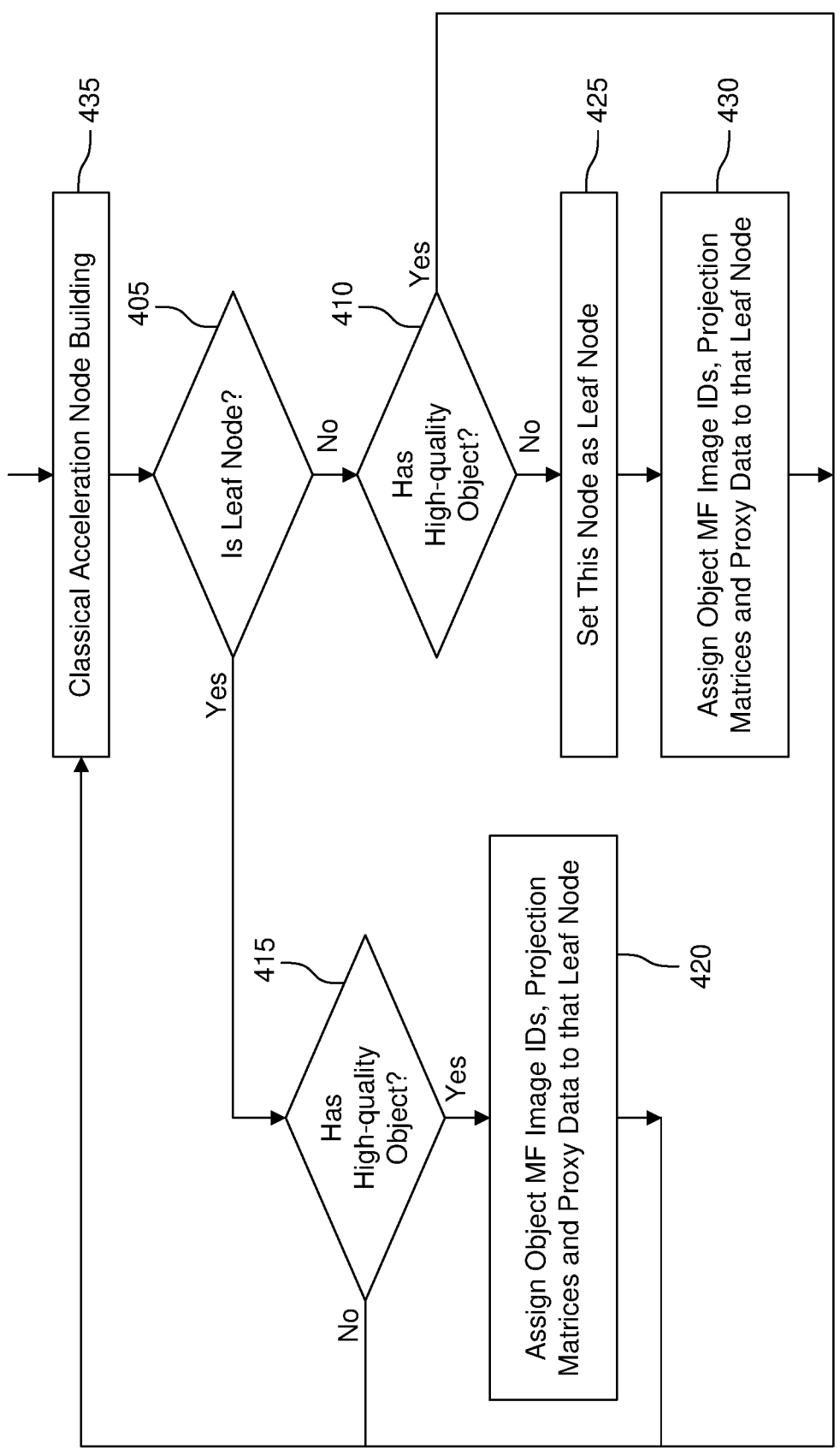
FIG. 4 is a flowchart for building a hybrid acceleration structure by adding an intermediate structures to a classical acceleration structure.

At step 405 of FIG. 4, a determination as to whether a leaf node is present is made. If the leaf node includes one or more low quality rendering objects (step 415), object middle-field image unique identifiers (IDs), projection matrices and proxy data is assigned to the leaf node (step 420). If the object is a low quality rendering object (steps 405 and 410), set this node as a leaf node (step 425) and assign object middle-field image unique identifiers (IDs), projection matrices and proxy data to such leaf node (step 430). If the leaf node is a high-quality rendering object (step 415), or if the object is a high-quality rendering object (step 410), classical acceleration node building is performed (step 435).

Figure 6:
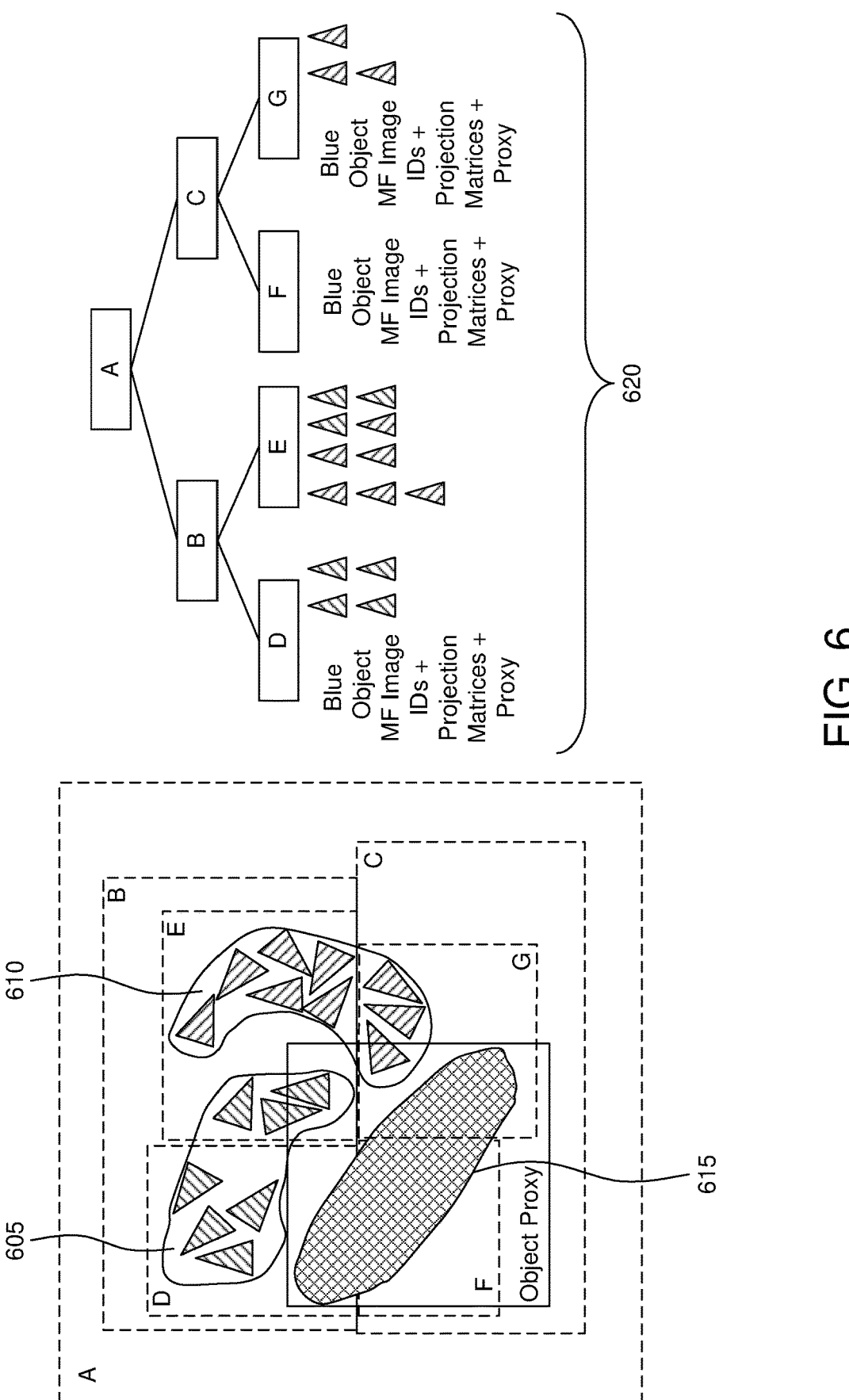
FIG. 6 is an illustration of the resulting hybrid acceleration structure where only the blue object is classified as a low-quality rendering object for a frame of a 3D scene.

FIG. 6 is an illustration of an exemplary hybrid acceleration structure where only the blue object 615 is classified as a low-quality rendering object for a frame of a 3D scene. The red and green objects 605, 610 are classified as high-quality rendering objects for this frame of the 3D scene. The corresponding binary tree 620 for the resulting hybrid acceleration structure is also shown.

Figure 7:
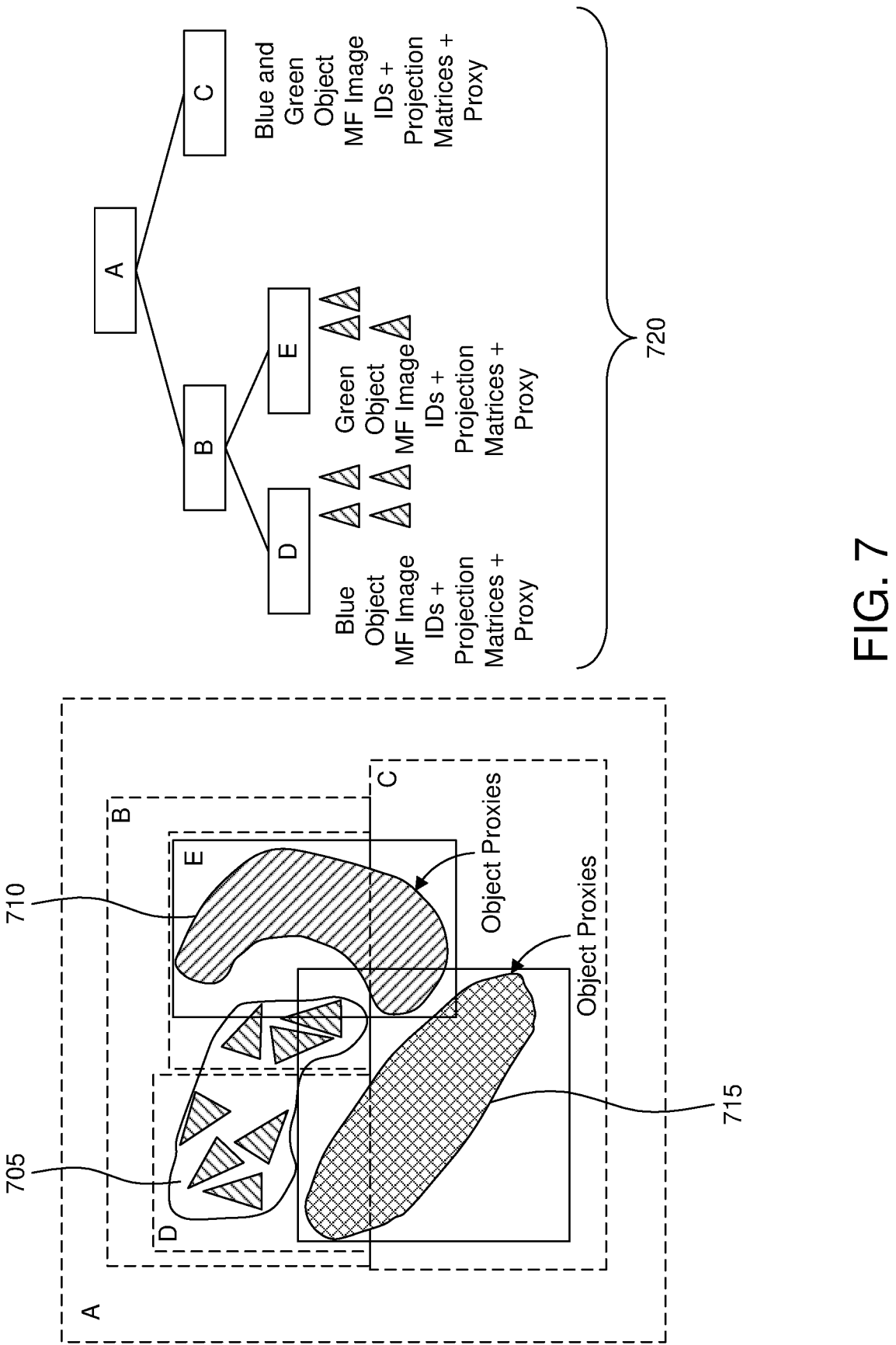
FIG. 7 is an illustration of the resulting hybrid acceleration structure where both blue and green objects are classified as low-quality rendering objects for a frame of a 3D scene.

FIG. 7 is an illustration of another exemplary hybrid acceleration structure where both the blue and green objects 715, 710 are classified as low-quality rendering objects for a frame of a 3D scene. In this exemplary hybrid acceleration structure, only the red object 705 is classified as a high-quality rendering object for this frame of the 3D scene. The corresponding binary tree 720 for the resulting hybrid acceleration structure is also shown.

Referring to step 240 of FIG. 2, a color contribution for each selected object is determined based on the hybrid acceleration structure constructed in step 230. At step 250, the 3D scene is rendered based on the hybrid acceleration structure for the selected objects of the scene. The rendering of the 3D scene is performed by a camera 350 (FIG. 3) using ray tracing.

Available ray types commonly used for raytracing are:

Camera rays: the initial rays that come out of the camera.

Secondary rays: (next rays) generated when interacting with materials (e.g., reflection, refraction).

An exemplary mathematical definition for a ray group is:

$$\sum_{i}^{n} Ri(\theta, \psi, W)P,$$

where for a ray (Ri) in the group, P is the origin or destination of the rays in the group, the number of rays corresponds to the number of images which represent the intersected geometry group. $\theta$, $\psi$ are the rotation of a ray, and W is the approximation of the lobe size representing the divergence of the rays in the group.

The larger the lobe (W), the more blurred/anti-aliased the ray group if the ray is a camera ray. The larger the lobe (W), the rougher the ray group if the ray is a secondary ray (reflection/refraction) and the softer the ray group if the ray is a shadow ray. The minimum lobe size equates to 0 divergence. For such an instance, then one ray is enough to sample the domain (camera ray, reflection ray, refraction ray, shadow ray), thus n=1, for middle-field images.

For camera primary rays, the rendering of the camera primary rays is performed by activating the middle-field structure attached to the camera. The generated image corresponds to the rasterized image of the scene viewed by the camera. The content of each image pixel is a vector of three (3) float components storing the color information (e.g., red, green and blue color values) of the closest hit object.

For secondary rays, the rendering is performed for each visible object from the current camera. One exemplary embodiment for determining this visibility, is to check if the object bounding box intersects the camera frustrum (i.e., using for example, a viewing frustrum culling technique). Initially the middle-field structure(s) attached to the object(s) is/are activated. Then the color information is retrieved by an adequate look-up of the generated images.

Figure 8:
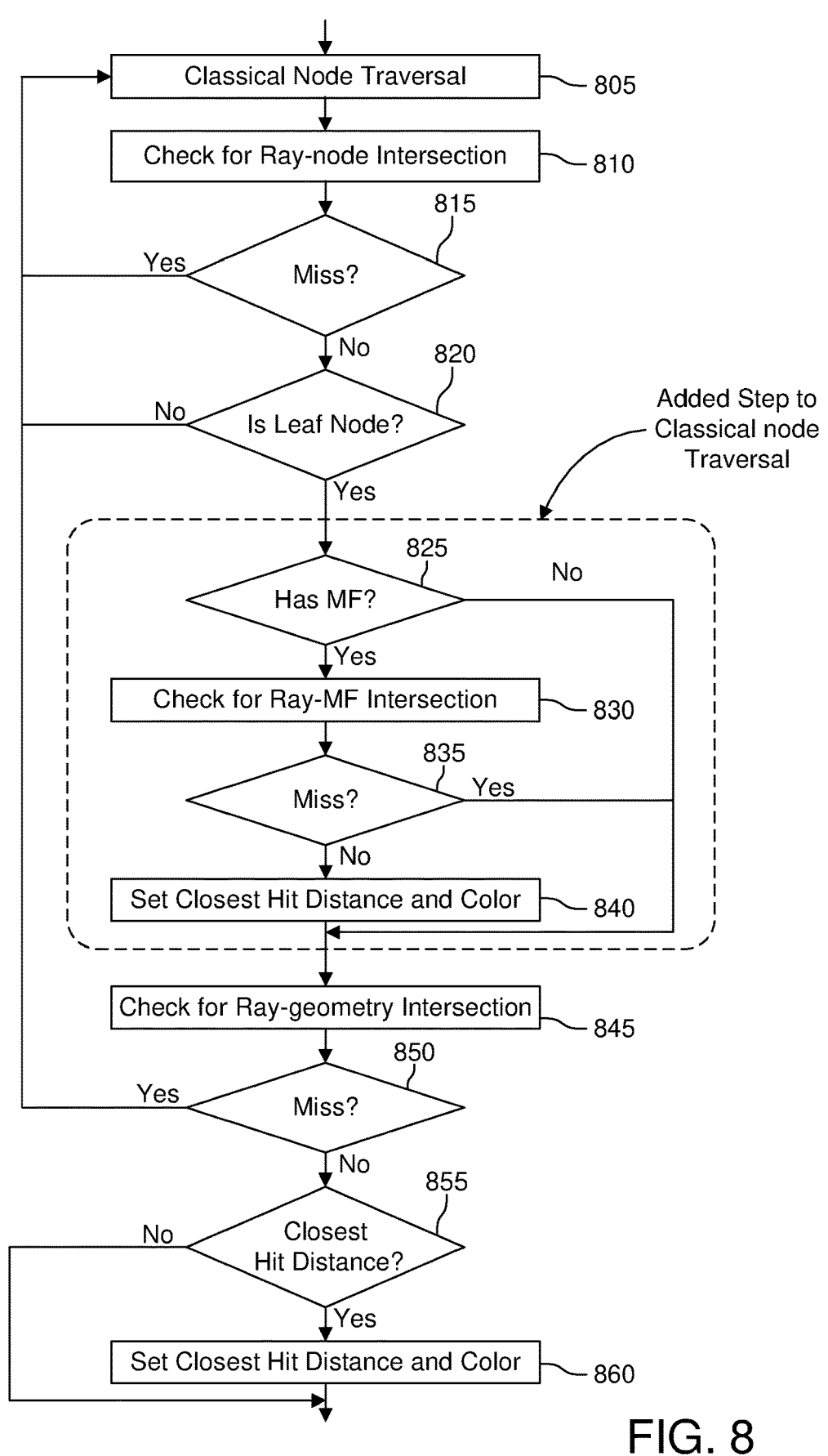
FIG. 8 is a flowchart of the steps added to the nodes of the classical acceleration structure to support the intermediate acceleration structures of the hybrid acceleration structure.

When traversing each node of the hybrid acceleration structure (FIG. 5), the steps 825-840, are added to a classical acceleration structure described in the flowchart shown in FIG. 8. Steps 825-840 are added to support the middle-field (intermediate) acceleration structures of the hybrid acceleration structure. Referring to the flowchart of FIG. 8, at step 810 a check is made for ray-node intersection.

At step 815 of FIG. 8, if there is not a ray-node intersection, a determination as to whether there is a leaf node is performed, at step 820. If there is a leaf node the flowchart proceeds to steps 825-840 to add middle-field (intermediate) structure information to the classical acceleration structure. When the leaf node includes one or more low quality rendering objects (step 825), a check for a middle-field-ray intersection (for both proxy and middle-field images) is performed (step 830).

Step 830 of FIG. 8 is further explained below with reference to FIG. 9. For each low-quality rendering object (step 905), get the object proxy geometric data (step 910). If a traversed leaf node contains one or more low-quality rendering objects, a check for the ray intersection with the middle-field representation (proxy and middle-field images) is performed (step 915). Referring to steps 920 and 925 of FIG. 9, the check for the ray intersection with the middle-field representation (step 915) is performed using the object middle-field image unique identifiers (IDs), the related camera projection matrices and proxy geometric data that were stored in the corresponding leaf node(s) (step 430 of FIG. 4).

Figure 9:
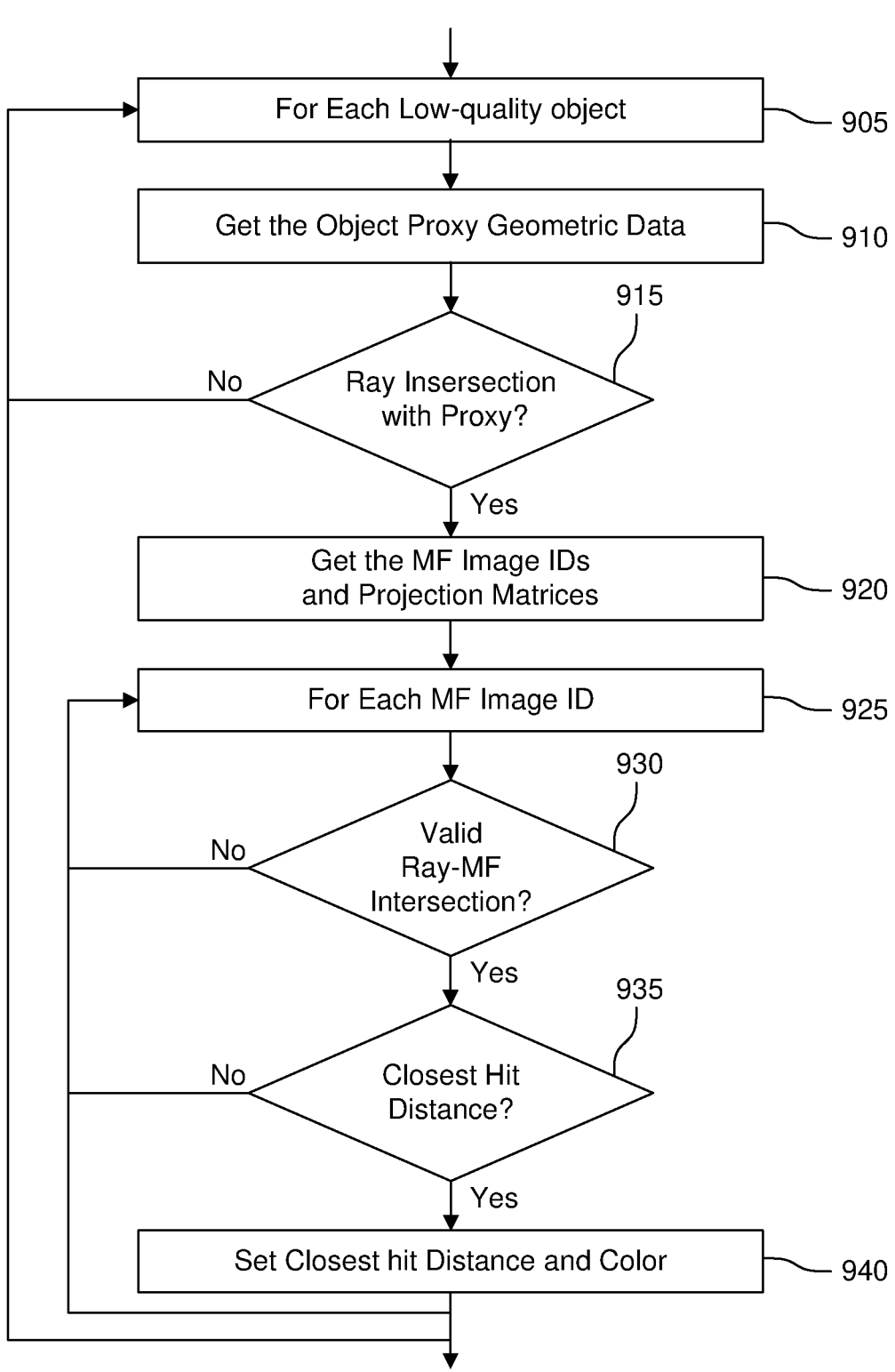
FIG. 9 is a flowchart detailing step 830 of the flowchart shown in FIG. 8.
Figure 10:
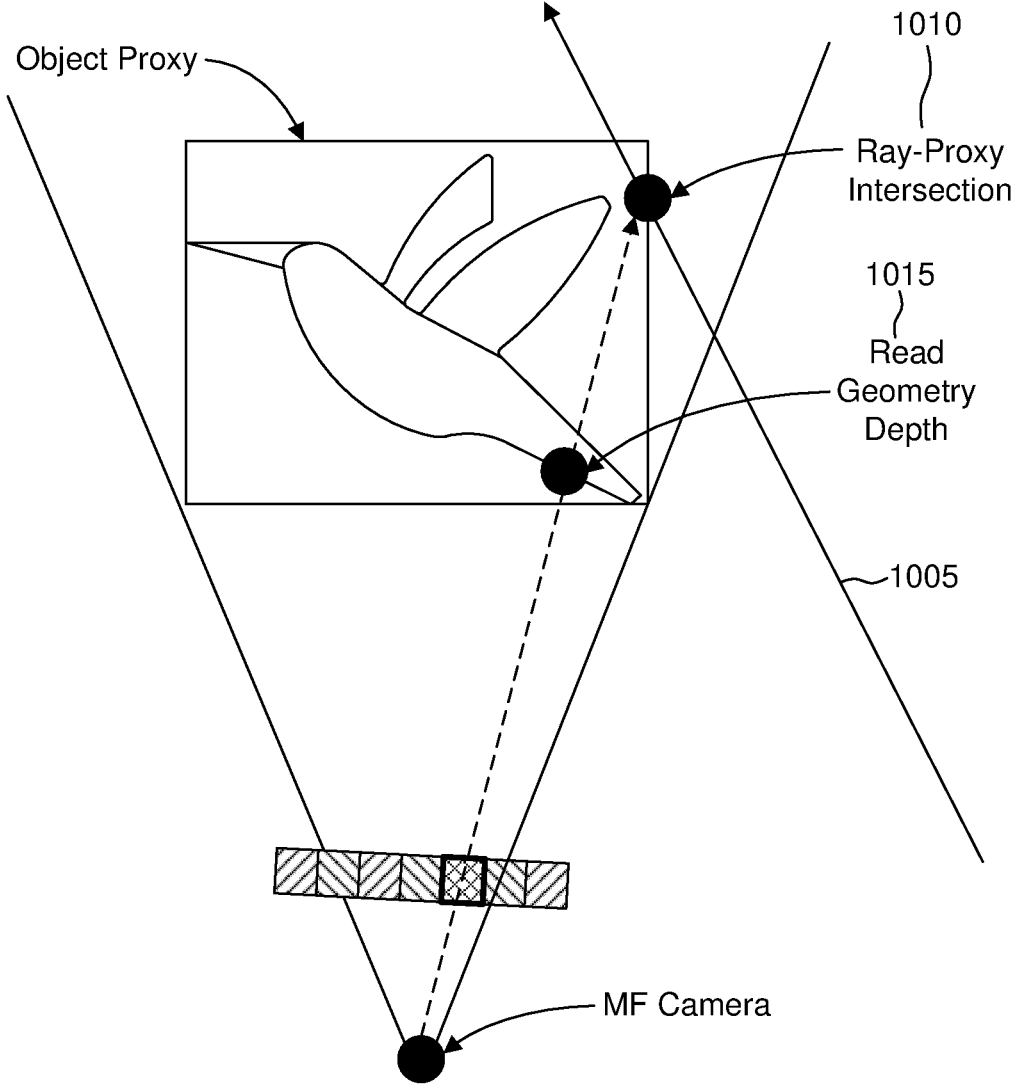
FIG. 10 is an illustration of the comparison between the depth of the target proxy intersection point and the read geometry depth for the bird shown in FIG. 3.

Step 930 of FIG. 9, a determination as to whether the ray-middle-field intersection point is valid is made. The criteria for determining a valid intersection point is:

the intersection point is inside the frustrum of the virtual camera corresponding to the current middle-field image a geometry is hit inside the proxy (i.e., the read depth value shall not be equal to the virtual camera far plane distance)

the depth of the proxy intersection point shall be lower than the read geometry depth to avoid visual ghost artifacts Referring to FIG. 10, a non-limiting exemplary embodiment analyzing the determination as to whether the ray-middle-field intersection point is valid. The ray 1005 hits the target proxy at intersection point 1010 and a valid target geometry depth can be read 1015. However, the ray 1005 does not intersect the target geometry (bird). Additionally, as the depth of the target proxy intersection point 1010 is higher than the read geometry depth 1015, intersection point 1010 is not a valid intersection point.

At steps 935-940 of FIG. 9 as well as steps 855-860 of FIG. 8, for those intersection points that are valid, the color contribution is taken. All color contributions are accumulated as per ray energy. The accumulation of the color contributions of all virtual cameras for the hit object requires the calculation of blending weights. One example for accumulations of the color contributions uses the local cubemaps blending weight calculation proposed by S. Lagarde in "Image-based Lighting Approaches and Parallax-corrected Cubemap", Siggraph 2012, Los Angeles, CA, USA, August 2012.

Figure 11:
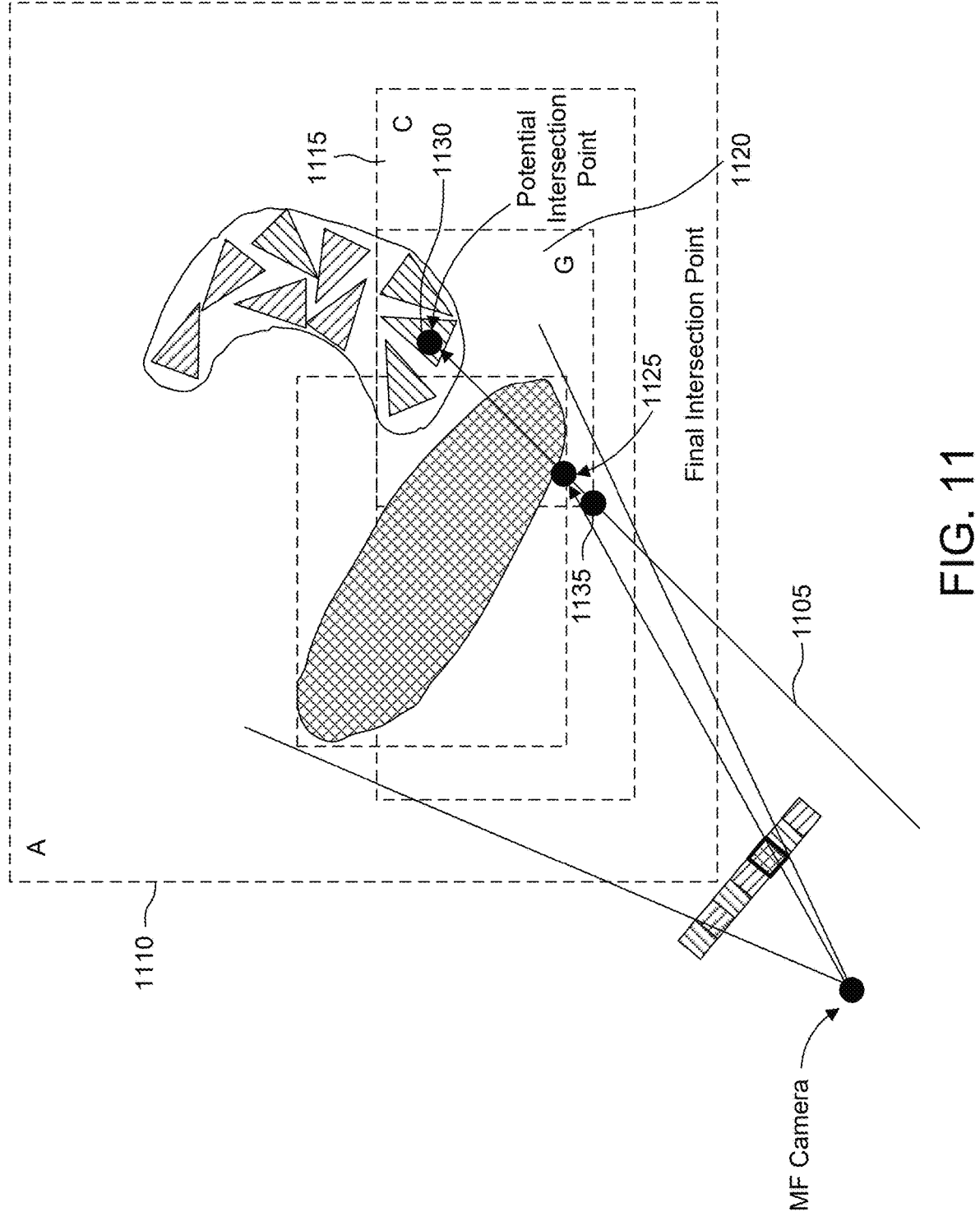
FIG. 11 is an illustration depicting ray traversal of a portion of the hybrid acceleration structure of FIG. 6.

FIG. 11 is an illustration depicting ray traversal of a portion of the hybrid acceleration structure for the 3D scene depicted in FIG. 6. In FIG. 6, only the blue object 615 is classified as a low-quality rendering object for this frame. Referring to FIG. 11, ray 1105 traverses the A 1110, C 1115 and G 1120 leaf nodes. In the G 1120 leaf node, the low-quality rendering blue object hit point 1125 is closer to the hit point 1130 of the high-rendering quality green object than hit point 1135. Thus, hit point 1125 considered as the final intersection point.

Figure 12:
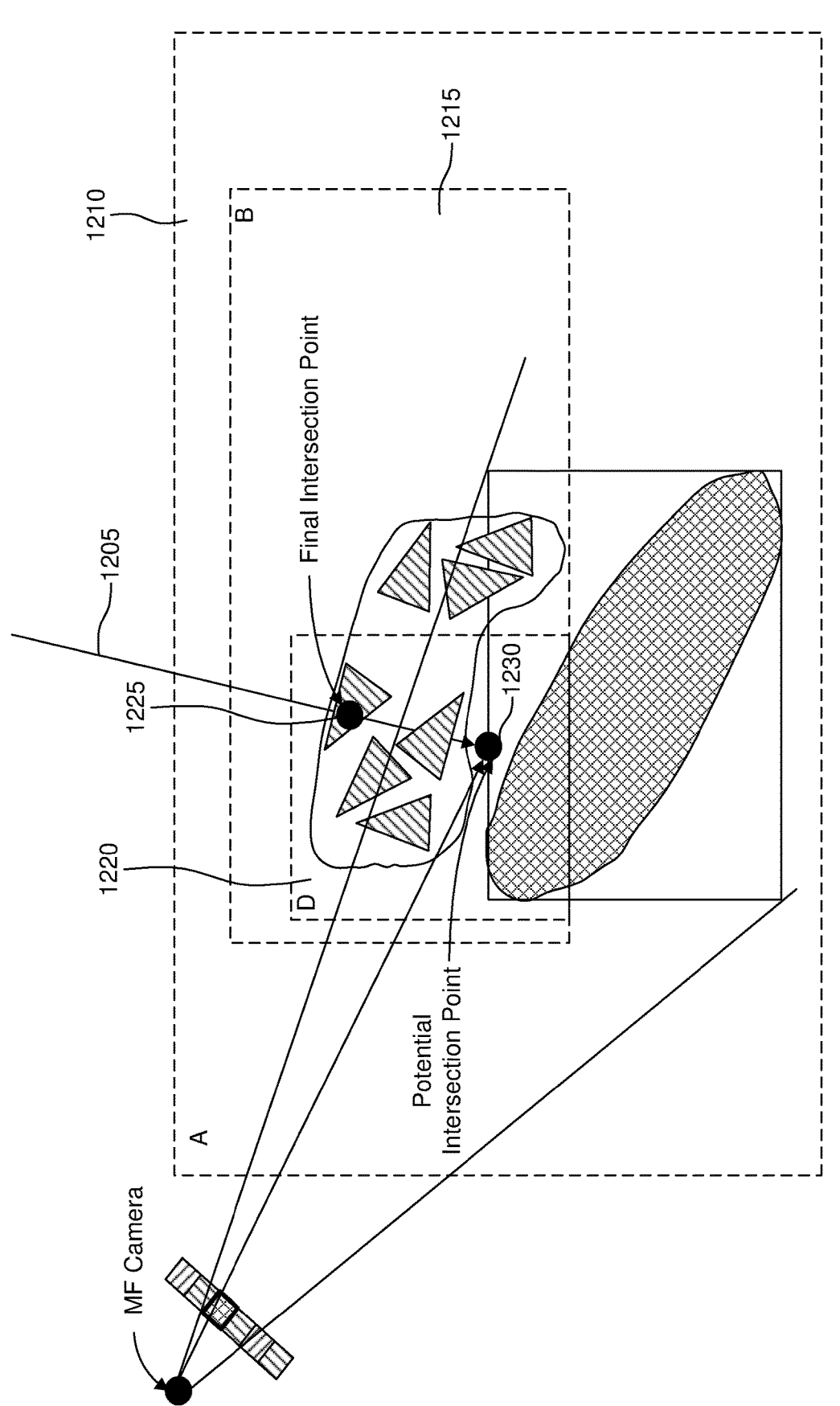
FIG. 12 is an illustration depicting ray traversal of another portion of the hybrid acceleration structure of FIG. 6.

FIG. 12 is an illustration depicting ray traversal of another portion of the hybrid acceleration structure for the 3D scene depicted in FIG. 6. Referring to FIG. 12, ray 1205 traverses the A 1210, B 1215 and D 1220 leaf nodes. In the D 1220 leaf node, the high-quality rendering red object hit point 1225 is closer than the hit point 1230 of the low-rendering quality blue object. Thus, hit point 1225 considered as the final intersection point.

Although the present embodiments have been described hereinabove with reference to specific embodiments, the present disclosure is not limited to the specific embodiments, and modifications will be apparent to a skilled person in the art which lie within the scope of the claims.

Many further modifications and variations will suggest themselves to those versed in the art upon making reference to the foregoing illustrative embodiments, which are given by way of example only and which are not intended to limit the scope of the invention, that being determined solely by the appended claims. In particular, the different features from different embodiments may be interchanged where appropriate.

The invention claimed is:

1. A method, comprising:
identifying a set of parameters for one or more objects in a three-dimensional (3D) scene of a video;
determining intermediate structures and corresponding substitute objects for each of the one or more objects in the 3D scene based on the set of identified parameters,
wherein each substitute object comprises a middle-field image or a proxy object that comprises an identifier having color and depth information;
determining a hybrid acceleration structure that integrates the intermediate structures with nodes of a classical acceleration structure, the hybrid acceleration structure including, for each reflective or refractive object of the 3D scene, an indicator specifying whether a color contribution for the object is ray traced or is derived from a substitute object;
determining a color contribution for the determined hybrid acceleration structure by selectively combining ray-traced color data and substitute-object color data in accordance with the indicator; and
providing for rendering the 3D scene of the video based on the determined color contribution of the hybrid acceleration structure.

2. The method of claim 1, wherein the set of parameters comprises at least one of a rendering quality level, an environment importance value and information about the reflective and refractive objects in the 3D scene.

3. The method of claim 1, wherein the intermediate structures comprise an identifier which comprises color and depth information associated with each substitute object.

4. The method of claim 1, wherein the intermediate structures are determined using an array camera projection matrix for each substitute object representing a middle-field image or proxy object.

5. The method of claim 1, wherein the corresponding substitute objects include geometric data that defines the proxy object within the hybrid acceleration structure.

6. The method of claim 5, wherein the geometric data is at least one of a center location, and x, y and z-extend values for a primitive shape.

7. The method of claim 1, wherein the classical acceleration structure is one of a grid structure, a bounding volume hierarchy (BVH) structure, a k-dimensional tree structure and a binary space partitioning data structure.

8. A device for rendering a three-dimensional (3D) scene of a video, comprising:
at least one processor configured to:
identify a set of parameters for one or more objects in a 3D scene of the video;
determine intermediate structures and corresponding substitute objects for each of the one or more objects in the 3D scene based on the set of identified parameters,
wherein each substitute object comprises a middle-field image or a proxy object that comprises an identifier having color and depth information;
determine a hybrid acceleration structure that integrates the intermediate structures with nodes of a classical acceleration structure, the hybrid acceleration structure including, for each reflective or refractive object of the 3D scene, an indicator specifying whether a color contribution is ray traced or is derived from a substitute object;
determine a color contribution for the determined hybrid acceleration structure by selectively combining ray-traced color data and substitute-object color data in accordance with the indicator; and
provide for rendering the 3D scene of the video based on the determined color contribution of the hybrid acceleration structure.

9. The device of claim 8, wherein the set of parameters comprises at least one of a rendering quality level, an environment importance value and information about the reflective and refractive objects in the 3D scene.

10. The device of claim 8, wherein the intermediate structures comprise an identifier which comprises color and depth information associated with each substitute object.

11. The device of claim 8, wherein the intermediate structures are determined using an array camera projection matrix for each substitute object representing a middle-field image or proxy object.

12. The device of claim 8, wherein the corresponding substitute objects include geometric data that defines the proxy object within the hybrid acceleration structure.

13. The device of claim 12, wherein the geometric data is at least one of a center location and x, y, and z-extend values for a primitive shape.

14. The device of claim 8, wherein the classical acceleration structure is one of a grid structure, a bounding volume hierarchy (BVH) structure, a k-dimensional tree structure and a binary space partitioning data structure.

* * * * *